IDENTIFICATION OF CHEMICAL SUBSTANCES

Filed Sept. 18, 1962 8 Sheets-Sheet 1

David C. T. Shang
INVENTOR.

BY S. A. Giarratana
George B. Oujevolk
attorneys

ACETYLENE GAS

METHANE GAS

MIXTURE OF ACETYLENE AND METHANE GAS

David C. T. Shang
INVENTOR.

BY S. A. Giarratana
George B. Oujevolk
attorneys

July 13, 1965 D. C. T. SHANG 3,194,053

IDENTIFICATION OF CHEMICAL SUBSTANCES

Filed Sept. 18, 1962 8 Sheets-Sheet 3

METHANOL

METHANOL WITH HORIZONTAL SCALE EXPANDED TO SHOW WAVE SHAPE

ETHANOL

David C. T. Shang
*INVENTOR.*

BY S. A. Giarratana
George B. Oujevolk
attorneys

July 13, 1965 D. C. T. SHANG 3,194,053

IDENTIFICATION OF CHEMICAL SUBSTANCES

Filed Sept. 18, 1962 8 Sheets-Sheet 4

ETHANOL WITH HORIZONTAL SCALE EXPANDED TO SHOW WAVE SHAPE

PROPANOL

PROPANOL WITH HORIZONTAL SCALE EXPANDED TO SHOW WAVE SHAPE

David C. T. Shang
INVENTOR.

BY S. A. Giarratana
George B. Oujevolk
attorneys

BUTANOL

BUTANOL WITH HORIZONTAL SCALE EXPANDED TO SHOW WAVE SHAPE

N-AMYL ALCOHOL

David C. T. Shang
INVENTOR.

BY S.A. Giarratana
George B. Oujevolk
attorneys

July 13, 1965 D. C. T. SHANG 3,194,053

IDENTIFICATION OF CHEMICAL SUBSTANCES

Filed Sept. 18, 1962 8 Sheets-Sheet 6

N AMYL ALCOHOL WITH HORIZONTAL SCALE EXPANDED TO SHOW WAVE SHAPE

ORTHO-XYLENE

ORTHO-XYLENE WITH HORIZONTAL SCALE EXPANDED TO SHOW WAVE SHAPE

David C. T. Shang
INVENTOR.

BY S. A. Giarratana
George B. Oujevolk
attorneys

PARA-XYLENE

PARA-XYLENE WITH HORIZONTAL SCALE EXPANDED TO SHOW WAVE SHAPE

David C. T. Shang
INVENTOR.
BY S. A. Giarratana
George B. Oujevolk
attorneys

META-XYLENE

META-XYLENE WITH HORIZONTAL SCALE EXPANDED TO SHOW WAVE SHAPE

David C. T. Shang
INVENTOR.

BY S. A. Giarratana
George B. Oujevolk
attorneys 3,194,053
Patented July 13, 1965

3,194,053

IDENTIFICATION OF CHEMICAL SUBSTANCES

David C. T. Shang, Cedar Grove, N.J., assignor to General Precision Inc., Little Falls, N.J., a corporation of Delaware Filed Sept. 18, 1962, Ser. No. 224,296
5 Claims. (Cl. 73—23)

Figure 1:
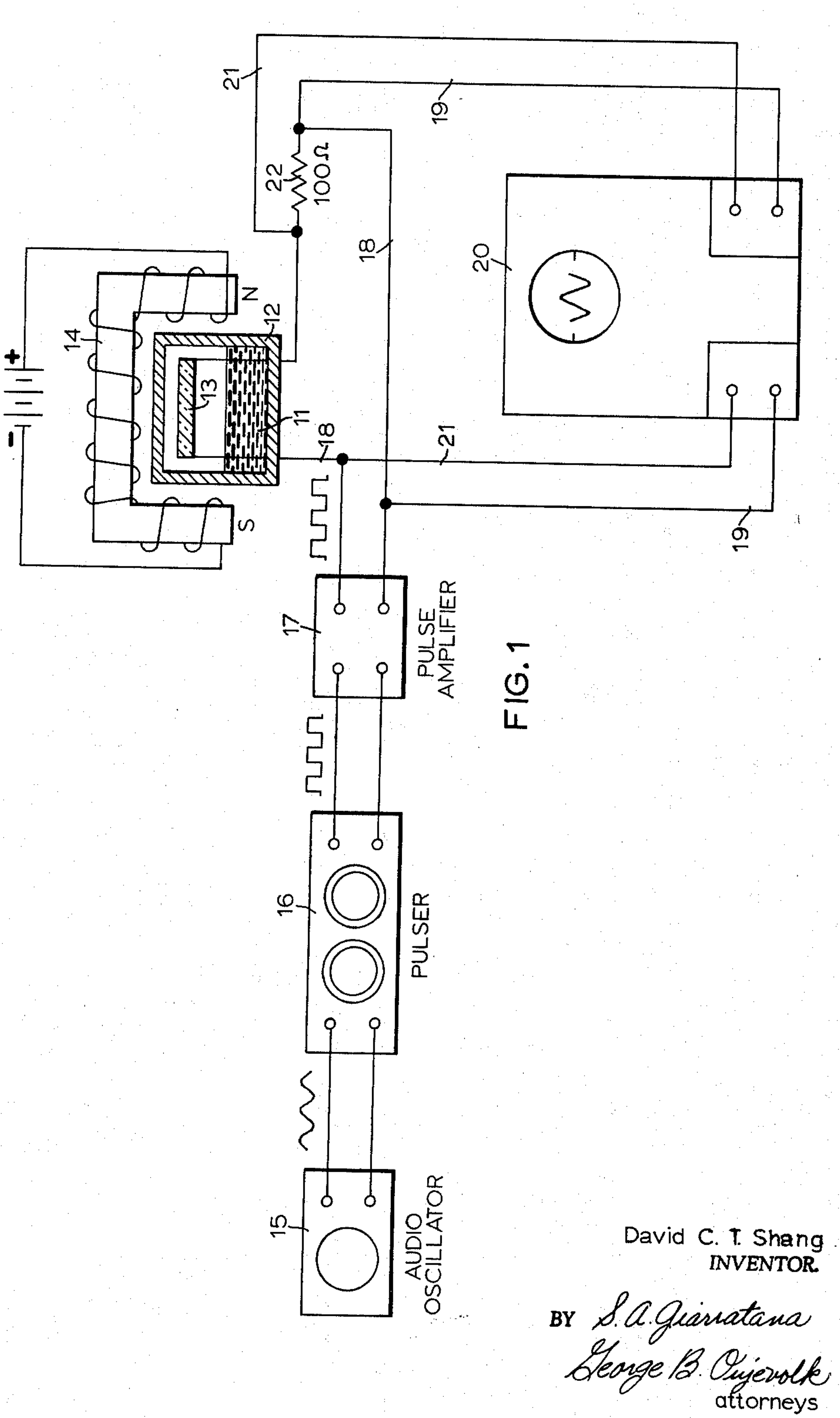
Figure 2:
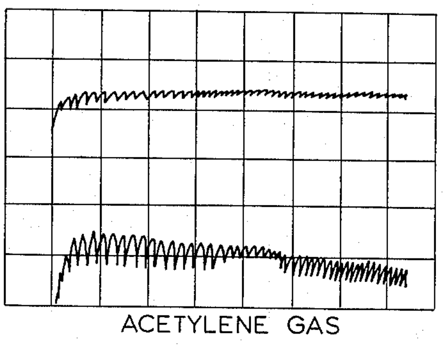
Figure 3:
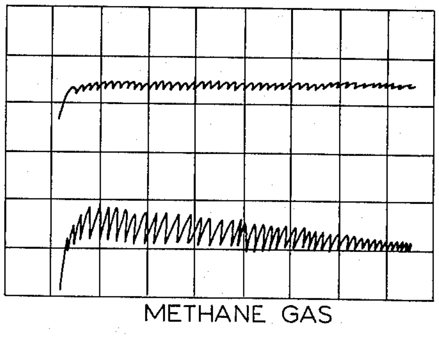
Figure 4:
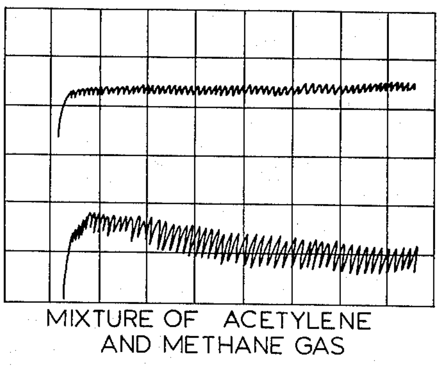
Figure 5A:
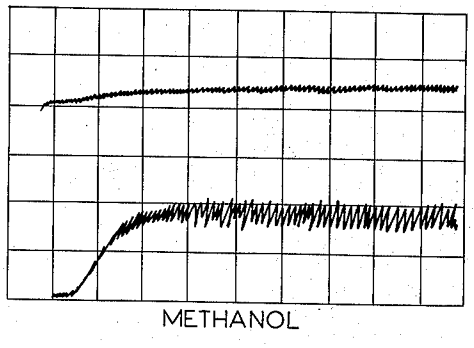
Figure 5B:
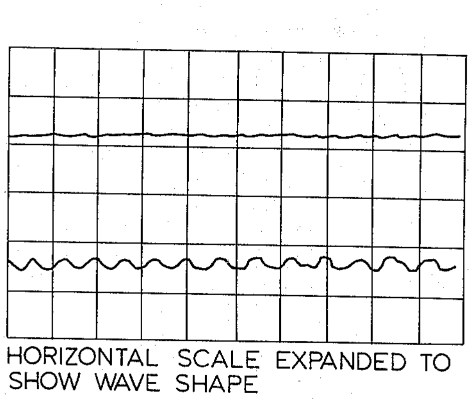
Figure 6A:
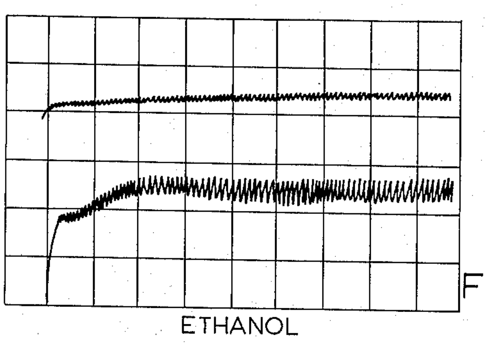
Figure 6B:
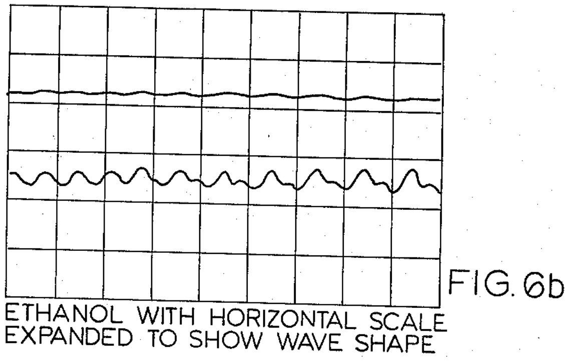
Figure 7A:
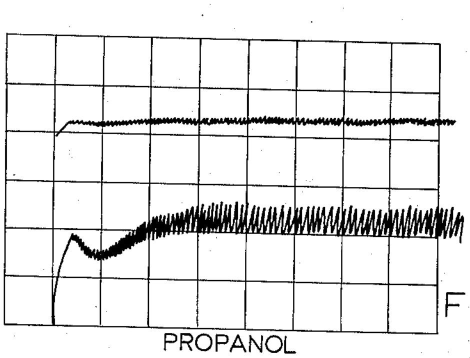
Figure 7B:
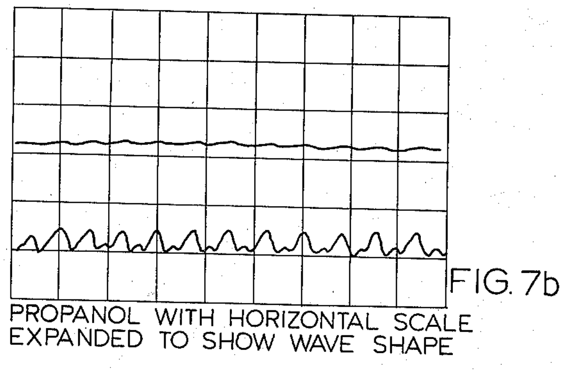
Figure 8A:
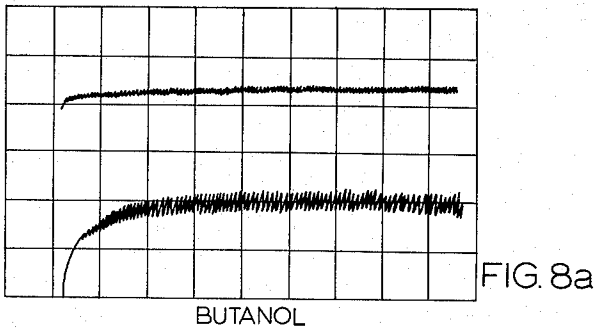
Figure 8B:
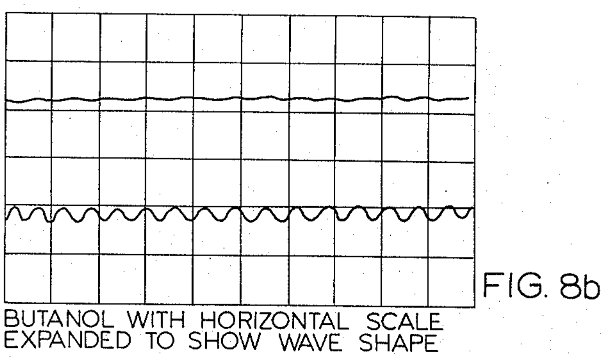
Figure 9A:
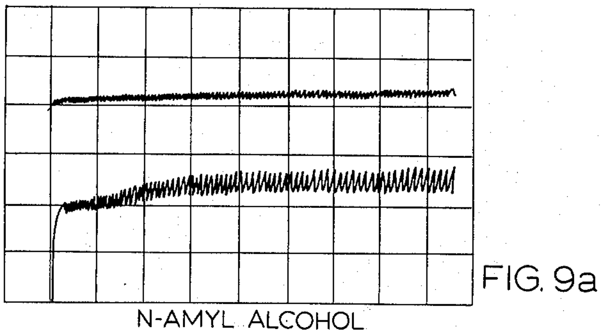
Figure 9B:
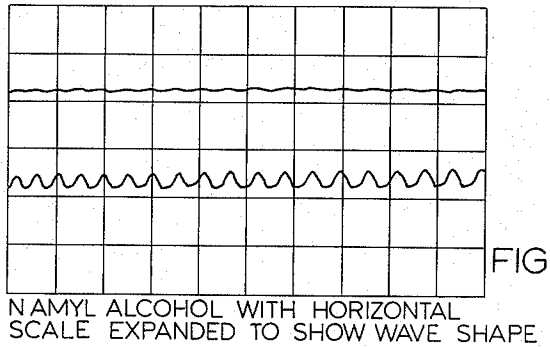
Figure 10A:
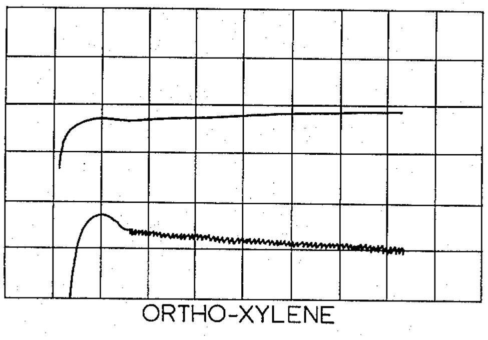
Figure 10B:
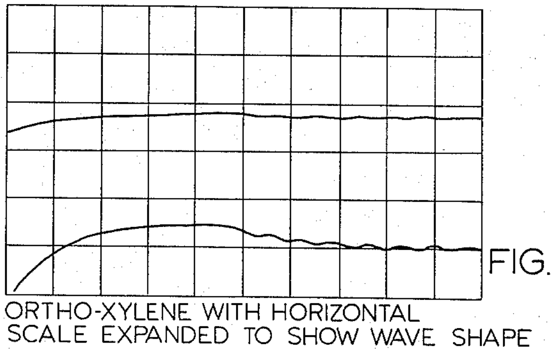
Figure 11A:
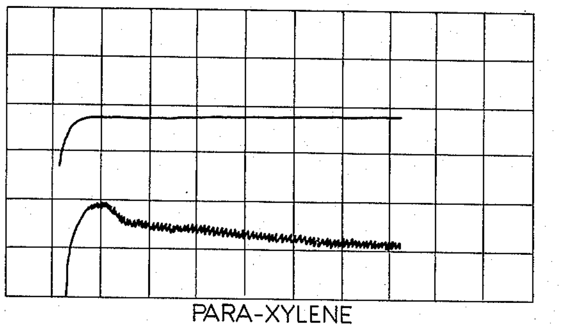
Figure 11B:
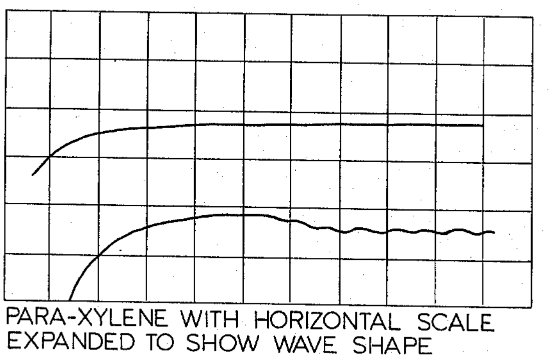
Figure 12A:
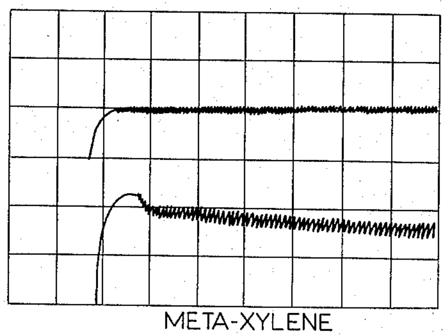
Figure 12B:
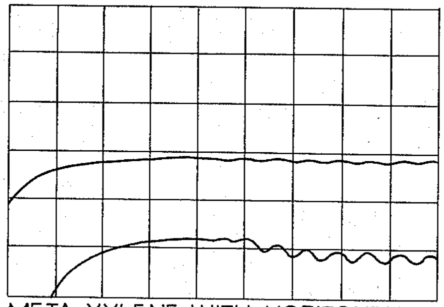

The present invention relates to the identification of chemical substances and more particularly to a method of chemical analysis which can be performed without the use of reagents, treating of the sample, or which requires skilled chemists.

Heretofore, several types of apparatus have been used and sold commercially for chemical analysis. One of the most widely used techniques is that of gas chromatography which is used for determining the components of a mixture. Present practice consists of sampling a small volume of material, e.g., 1 to 100 microliters, into a syringe. The needle of the syringe is sharp and narrow so that the sample can be injected through a rubber dam into a stream of flowing inert gas. The gas carries the sample to a column for separation. This column can be a narrow capillary or an inert supporting medium coated with a film of non-volatile oil. The components of the sample are now progressively dissolved and eluted from the non-volatile oil. Since gases, such as propane and butane, would have different solubilities and elution rates from the oil, they gradually separate. As they leave the column, the different fractions are detected by a variety of procedures such as the difference in thermal conductivity from the inert carrying gas, effect on the conductivity of a flame when burned, conductivity of ions formed when activated by a radioactive substance such as tritium or strontium —90 and a variety of other procedures. In cases of gases like oxygen, nitrogen and carbon dioxide, the columns may contain no oil, but contain a granular material such as natural or synthetic aluminum silicates or silica gel. In this case, the gases diffuse into the pores of the material and diffuse out sequentially. Thus, the porous material serves to separate gases such as oxygen and nitrogen by their different rates of diffusion into and out of the porous substances. Eventually, the gases separate and can be detected by various techniques, usually thermal conductivity. It is apparent that in this technique by gas chromatography the column needs to be tailored to fit the needs of the substances to be separated. A column which is satisfactory for gasoline mixtures may not serve for separating the components of ordinary air.

Another type of apparatus is sold commercially by the Technicon Corporation under the trade name "Autoanalyzer." In general, this apparatus mechanically simulates the manual work of the laboratory technician and will pass a plurality of test tubes past a dispensing station where a sample is introduced into a test tube containing a reagent. The tubes then move to a heating station and finally to a sample reading station where the sample is read by electronic reading means such as a densitometer. This apparatus originally introduced in the market in the 1940's has been considerably improved since the first crude apparatus was introduced. Nevertheless it still suffers from defects and has about reached the stage where the solution of one problem introduces new problems to be solved. The pumping mechanism has been criticized, and although a choice of pumping means are available, the users are not all in agreement as to what type of pumping means are needed for a particular task. The introduction of the sample into the test tubes is often uneven. Proper means for zeroing the densitometer have not been devised to the general satisfaction of the users. Many defects complained of are not the fault of the apparatus but of poor handling by unskilled technicians or of some of its components which are purchased and not manufactured by the suppliers of the apparatus. But, despite the fact that some users may not be entirely satisfied with it, the "Autoanalyzer" appears to be the most popular device now commercially available.

Another device recently exhibited is marketed by Scientific Industries, Inc. and is directed to the field of micro-chemistry. This arrangement described in U.S. Patent No. 3,036,893 has as its objective the presenting of small uniform micro-samples to electronic reading means. This is accomplished by means of a three tape technique described in the patent. Since this device is directed to micro-chemistry its use is more limited in scope than the other types of chemical analyzers generally used.

From the foregoing brief description of chemical analyzers, it is evident that a universal instrument, or an instrument approaching universal application has not as yet been devised. Each system currently in use relates to a particular type of analysis and the general nature of the sample must be known to the analyzer. Although many attempts are currently being made and have been made to provide more perfect devices useful in chemical analysis, these attempts generally are along the lines of performing automatically the tasks performed manually by technicians, and none, as far as I am aware can immediately provide the chemical analysis of a sample without the physical treatment of the sample.

The present invention is directed to a universal system of chemical analysis or the identification of chemical substances where the sample is usually neither treated nor manipulated, either by hand or by instruments and makes use of a component known as the oscillistor. Since the oscillistor is a new component which pertains to the science of electronics rather than to the science of chemistry, it is first necessary to review the current state of the art on the oscillistor before proceeding to a description of the present invention. This component appears to have been first described by I. L. Ivanov and S. W. Ryvkin in a U.S.S.R. technical publication and translated in English as "Journal Technical Physics," volume 28, page 774, 1958. According to the Ivanov et al. article, a germanium crystal, with a proper amount of impurities was set in a circuit with a battery, a resistor, and a switch. When this crystal was then placed in a magnetic field and the switch closed, oscillations were produced in the germanium crystal. The arrangement was given the name "oscillistor" by Dr. R. D. Larrabee of RCA, and, an article regarding the oscillistor was written in the March 9, 1962, issue of "Electronics" by Maurice Glicksman of RCA entitled "Using Instability Characteristics of Semiconductor Plasmas," pages 56 to 59. Although the oscillistor has evoked much scientific curiosity and several articles have been written regarding this phenomenon, also some branches of the Government have apparently awarded study contracts relating to the oscillistor, as far as I am aware, little practical use has been made of the oscillistor.

There exists therefore, a problem, namely identification of chemical substances or chemical analysis, which is in search of a solution; and, a solution, namely the oscillistor in search of a problem. In general, the present invention is concerned with the interrelation of these two, and, broadly stated, the present invention provides for a method of identifying chemical substances by making use of the properties of the oscillistor.

With the foregoing objective in view, the invention resides in the novel arrangement and combination of parts, in the details of construction, and in the process steps hereinafter described and claimed, it being understood that changes in the precise embodiment of the invention herein disclosed may be made within the scope of what is claimed without departing from the spirit of the invention.

The invention will appear more clearly from the following detailed description when taken in connection with the accompanying drawing showing by way of example, preferred embodiments of the inventive idea.

FIGURE 1 is a schematic representation of chemical analysis performed by use of the apparatus described herein; and FIGURES 2, 3, 4, 5(*a*), 5(*b*), 6(*a*), 6(*b*), 7(*a*), 7(*b*), 8(*a*), 8(*b*), 9(*a*), 9(*b*), 10(*a*), 10(*b*), 11(*a*), 11(*b*) and 12(*a*), 12(*b*) show various wave forms usnig the arrangement of FIGURE 1 in the analysis of various substances.

Generally speaking, the present invention contemplates the identification of a sample by placing the sample in sufficient proximity to an elongated thin semiconductor crystal slab, treated with the proper amount of impurities, so that the sample can affect the characteristic of the crystal. The crystal is subjected to the action of a magnetic field and to a pulsating input in the plane of its elongation. The crystal includes leads at opposed elongated ends thereof and the output across the leads is recorded and compared with the outputs of known substances obtained in the same way.

In carrying the invention into practice, an arrangement similar to that depicted in FIGURE 1 is employed. The sample 11 is in a container 12. In the vicinity of the sample is a slab of germanium crystal 13. Although in most instances, it is advantageous to place the crystal in physical contact with the sample, this is not essential, and, when undesirable, good results may be obtained by other methods, e.g., by shining light of a predetermined spectrum through the sample on the crystal. The crystal is in the field of an electromagnet 14 with the north and south poles as shown. An alternating excitation is supplied by an audio oscillator 15 to a pulser 16 which in turn feeds the pulse output to a pulse amplifier 17. The output of the pulse amplifier is in a circuit 18 with the crystal. The output of the pulse amplifier is also fed to an oscilloscope in a parallel circuit 19. The input and output across the crystal are fed across an oscilloscope 20 in an output circuit 21. Load is provided in the circuits by a 100 ohm resistor 22.

For the purpose of giving those skilled in the art a better understanding and appreciation of the invention, the following illustrative examples are given:

I. GENERAL PROCEDURE OF THE EXAMPLES

The crystal was placed in an enclosed container with the leads leading out of the container. The sample was either placed or fed into the container which was either opened or sealed depending on the nature of the sample whether liquid or gas. In the case of a gas, the oscillistor was placed and sealed between the magnetic field, only the inlet and outlet were open for the circulation of the gas. Air was pumped out by vacuum pump, then the gas was allowed to flow in under the control of flow meter. The data was taken after it has been flushed by the gas for more than 15 minutes. Then a pulse signal was injected to oscillistor and the oscillation was recorded. The excitation and pulse frequency was 7 cycles per second. The output on the oscilloscope was recorded on lithographic section paper having squares of 1 cm. x 1 cm. The output in each case has been reproduced in the drawing. As will be seen from examination of the examples, the output characteristics varied in the following respects:

(1) Appearance of the fundamental and harmonics;
(2) Configuration of the output wave;
(3) Amplitude of the output wave in units of squares;
(4) The input "tail";
(5) Shape of upper peaks;
(6) Shape of lower peaks.

For each of the following examples, two wave forms are shown in the figure corresponding to the example. The lower wave form represents the crystal output when subjected to the action of the sample and provides the foregoing characteristics. The upper wave form represents the input voltage.

II. EXAMPLE OF ACETYLENE GAS (1) Fundamental and harmonics: two fundamental frequency patterns with a bridge;
(2) Wave configuration: constant slopes down 1 square in 10 (tends to dampen);
(3) Amplitude: ¾ square;
(4) Tail: wavy sharp drop;
(5) Upper peak: rounded;
(6) Lower peak: pointed.

III. EXAMPLE OF METHANE GAS (1) Fundamental and harmonics: fundamental enters at 4th square;
(2) Wave configuration: damped, bottom peak horizontal;
(3) Amplitude: ⅘ down to ⅕ square;
(4) Tail: wavy, sharp drop;
(5) Upper peak: rounded;
(6) Lower peak: pointed.

IV. EXAMPLE OF METHANE AND ACETYLENE GAS MIXTURE (1) Fundamental and harmonics: harmonics in first two squares;
(2) Wave configuration: uneven with downward exponential sloping shape;
(3) Amplitude: ¾ square of main wave;
(4) Tail: wavy sharp drop, shows fundamental and harmonics;
(5) Upper peak: wishbone;
(6) Lower peak: wishbone.

V. EXAMPLE OF METHANOL (1) Fundamental and harmonics: harmonics show in main wave pattern;
(2) Wave configuration: constant and horizontal;
(3) Amplitude: ½ square;
(4) Tail: corkscrew;
(5) Upper peak: pointed;
(6) Lower peak: pointed.

VI. EXAMPLE OF ETHANOL (1) Fundamental and harmonics: a harmonic shows in fundamental pattern near lower peak;
(2) Wave configuration: constant horizontal;
(3) Amplitude: ½ square;
(4) Tail: corkscrew;
(5) Upper peak: elongated point;
(6) Lower peak: point and harmonic.

VII. EXAMPLE OF PROPANOL (1) Fundamental and harmonics: harmonic in fundamental pattern at lower peak;
(2) Wave configuration: constant, horizontal;
(3) Amplitude: +½ square;
(4) Tail: corkscrew;
(5) Upper peak: elongated point;
(6) Lower peak: point and harmonic.

VIII. EXAMPLE OF BUTANOL (1) Fundamental and harmonics: harmonics distort pattern;
(2) Wave configuration: constant horizontal;
(3) Amplitude: ⅓ square;
(4) Tail: gradual curve before steep drop;
(5) Upper peak: wishbone;
(6) Lower peak: wishbone.

IX. EXAMPLE OF N-AMYL ALCOHOL (1) Fundamental and harmonics: harmonic near lower peak;
(2) Wave configuration: constant horizontal;
(3) Amplitude: $\frac{1}{3}$ square;
(4) Tail: gradual slope before vertical drop;
(5) Upper peak: wishbone;
(6) Lower peak: mixed with harmonic.

X. EXAMPLE OF ORTHO-XYLENE (1) Fundamental and harmonics: unclear harmonic mixed with fundamental;
(2) Wave configuration: constant, slopes down;
(3) Amplitude: $\frac{1}{10}$ square;
(4) Tail: loop rise and vertical drop;
(5) Upper peak: round;
(6) Lower peak: round.

XI. EXAMPLE OF PARA-XYLENE (1) Fundamental and harmonics: only fundamental appears;
(2) Wave configuration: constant, slopes downwards;
(3) Amplitude: $\frac{2}{10}$ square;
(4) Tail: loop rise and vertical drop;
(5) Upper peak: round;
(6) Lower peak: round.

XII. EXAMPLE OF META-XYLENE (1) Fundamental and harmonics: only fundamental appears;
(2) Wave configuration: constant, slopes down;
(3) Amplitude: $+\frac{2}{10}$ square;
(4) Tail: loop rise and vertical drop;
(5) Upper peak: round;
(6) Lower peak: pointed.

*Summary of the examples*

ABBREVIATIONS

| | |
|---|---|
| B—Wishbone | L—Loop |
| C—Corkscrew | Lp—Long point |
| D—Down | N—Not Constant |
| F—Fundamental | P—Pointed |
| G—Gradual slope | R—Rounded |
| H—Horizontal | S—Sharp drop |
| h—harmonic | V—Vertical |
| I—Irregular | W—Wavy |
| K—Constant | |

| Fig. No. | Substance | Fundamental and Harmonic | Configuration | Amplitude | Tail Drop | Upper Peak | Lower Peak |
|---|---|---|---|---|---|---|---|
| 2 | Acetylene | FF | KDI | $\frac{3}{4}$ | WS | R | P |
| 3 | Methane | Fh | ND | $\frac{3}{8}$–$\frac{5}{8}$ | WS | R | P |
| 4 | Me+Ac | Fh | NDI | $\frac{3}{4}$ | WS | B | P |
| 5 | Methanol | h | KH | $\frac{1}{2}$ | C | P | P |
| 6 | Ethanol | Fh | KH | $\frac{1}{2}$ | C | Lp | Ph |
| 7 | Propanol | Fh | KH | $+\frac{1}{2}$ | C | Lp | Ph |
| 8 | Butanol | Fh | KH | $\frac{1}{3}$ | GS | B | B |
| 9 | N-Amyl | Fh | KH | $\frac{1}{3}$ | GV | B | h |
| 10 | O-Xylene | Fh | KD | $\frac{1}{10}$ | LV | R | R |
| 11 | P-Xylene | F | KD | $\frac{2}{10}$ | LV | R | R |
| 12 | M-Xylene | F | KD | $+\frac{2}{10}$ | LV | R | P |

*Identifying the substances*

From the foregoing summary, illustrating briefly only a few of the chemical substances, it is evident that the individual substances not only "display" a "readable" signal in an "understandable language," but furthermore, particular chemical groups display a group characteristic so as to provide the identity of an individual group member on which no prior data has been recorded.

Different crystals will provide different output frequencies, but the other characteristics mentioned, namely the fundamental and harmonics, wave configuration, amplitude, tail drop, upper and lower peak shapes remain the same.

To persons unskilled in the art of computer operation the wave patterns may well look like Chinese writing to an occidental particularly when the occidental is told that there are well over 50,000 ideographs which is about the limit that an educated Chinese can read.

Considering that there are well over 50,000 chemical substances which may have to be identified, it is quite obvious that the human mind cannot remember the output wave characteristics of all possible substances, and indeed, we fortunately have computers to do this work who readily remember many times 50,000 wave shapes. And, just as in Chinese ideographs, the individual components of each ideograph may readily be broken down into a radical which may appear at the left, right, top, bottom or middle, and reappear as subordinate parts of ideographs together with other simple subordinate parts, in the same way wave shapes can be classified, programmed, and fed to a computed to the extent that if an unknown is then queried of the computer, the computer can then provide the chemical formula or name of the unknown from its memory. Even if this unknown is not in the memory, it can then supply the closest homologue analogs or other similar substance, from which the composition of the unknown can be readily deduced by a skilled chemist. The summary of output wave characteristics given herein are only the most salient features discernible to the imperfect human eye. It is readily apparent to those skilled in the art that more "readable" signals can be produced having many more distinctions apparent to an electronic "eye," and the proper programing of such a system is within the skill of the art and beyond the scope of the present application.

*Theory*

The theory of the present invention has not been fully developed and the present invention is based upon the results obtained rather than a complete theoretical understanding. It is generally known that if a germanium bar is subjected to both a magnetic field and a current flow, oscillation will be generated in the bar. This phenomenon was originally discovered by V. I. Stafeev another Russian scientist and was further investigated by Ivanov and Ryvkin hereinbefore mentioned. These scientists stated that the oscillistor will change its amplitude and frequency if such factors as the input current, field intensity, orientation in the field, illumination and temperature are changed. But the data given by these Russian scientists is not complete and their conclusion is rather broad and exceeds the experimental data supplied. Their report lacks the explanation of the basic nature of such oscillation. Although the theory concerning the phenomena of oscillistor has not been fully developed and confirmed. It could be explained as being caused by: (*a*) conductivity variation taking place through a change in the number of free carriers, or (*b*) the effective mobility of the coupled carriers. The American scientists Larabee and Steele, 31 Journal Applied Physics (1960) page 1519, back the first theory. Certain conditions appear to be mandatory for oscillation: (*a*) semiconductor intrinsic material with two contacts, ohmic and rectifying, so that injection of plasma is possible; (*b*) a magnetic field providing inductive effect; (*c*) a direct current signal passing through the semiconductor material. Orientation of the magnetic field is very important for oscillation. It is experimentally confirmed that the magnetic field must be parallel to the direction of current. The direction of the current should be injected through ohmic junction toward rectifying junction. In order to obtain oscillation the threshold value of the magnetic field must be within a certain range. Any value under or beyond such range does not generate oscillation. Each oscillistor differs from the other in the range of magnetic threshold, and this value is only obtainable through experimentation.

Attempts have been made to explain the operation of the oscillistor as a plasma device, a surface reaction device, a surface recombination effect, a surface capacitance effect, etc., and a discussion of these theories is beyond the scope of the present invention.

On the other hand, the action of chemical substances in an electromagnetic field has also been the subject of considerable study, e.g., electrophoresis. It is well known that different substances not only have an electric charge, but in the presence of an electric field tend to migrate in the direction of opposed poles. The rate of electrophotoretic mobility of different substances is also different and mixtures of substances can be separated by placing the substance on a supporting medium and passing a direct current through the medium for a sufficient length of time. The substances will then physically move along the medium in response to the applied electric field and because of the difference in electrophoretic mobility of the individual substances, separation is finally achieved.

When liquid chemicals are brought into contact with oscillistor the resulting frequency output differs with each chemical. As previously mentioned, there are several factors which may be involved in an oscillistor device: magnetic field, current, plasma, and the surface reaction. These factors interact with each other, producing a complex-oscillation effect. The action of chemicals on the oscillistor under both magnetic and electrical influences adds more complexity to the oscillation effect. The oscillistor surface is under an activated state due to the diffusion of electron-hole which are in constant motion from the center of the plasma to the surface of the semiconductor. If the surrounding environment is air, the diffusion of electron-hole will form a mutual exchange with air molecules. The exchange process with liquid chemicals or gaseous chemicals appears to occur even easier. Since each chemical differs in its rate and quantity of releasing and absorbing surface electron, the produced frequency output varies accordingly. When an oscillistor is subjected to the action of a chemical, its capacitance effect appears to be disturbed. The dielectric constant of the chemical appears to play a very import part in this reaction.

Examining the accompanying figures, the frequencies produced by the alcohol group are more complexed than the benzene group. The cause of this difference is probably due to the electronic structure of the chemicals. Chemical substances may be considered as being in a state of electronic resonance. The electron moves from the source of abundance to the deficient area. Within an organic molecule any atom which has unshared electrons or any multiple linkage may serve as an electron source, and any atom multiple linked or deficient in electrons may serve as an electron sink, i.e. the double bond of benzene ring serves as electron source, and the multiple linked carbon becomes electron deficient. The produced electron resonance therefore will be:

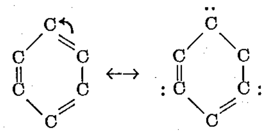

The electron moves back and forth from one atom to the other thus forming its basic nature of stability and reactivity. The diffusion electron of oscillistor enters the resonance of the chemical and forms a process of electron interchange, which in turn affects its oscillation and frequency output. The mutual exchange of electron may proceed through two basic mechanisms, the active center mechanism and the adsorptive mechanism of the semiconductor surface.

Active center mechanism is the term generally applied in the field of catalysis. Only certain spots of the semiconductor surface are active. Through these centers the exchange of electrons takes place (i.e. hydrogen-platinum). Any solid substance emerged into liquid or gas will adsorb either substance (chemosorption). The strong bonding force between them may be expressed as electron sharing. To separate the monomolecular layer of the substance from the semiconductor surface under these circumstances is a very difficult task. This adsorption effect leads to the disturbance of oscillation thus generating different frequencies. By their response to the magnetic effect, all chemicals can be classified into three classes: diamagnetic, paramagnetic, and ferromagnetic. These three categories have different permeabilities, namely, diamagnetic materials have permeability of less than one, paramagnetic around one, and ferromagnetic of much more than one. Any chemical, if placed under the magnetic field, will receive an induction moment from the magnetic field. The atoms of the substances respond to the inductive moment differently. The term magnetic susceptibility is used to define the inductive moment effect. Since diamagnetic materials respond to the magnetic effect differently than other chemicals, the expression for such effect is:

$$X_A = -2.832r^2 \times 10^{10}$$

$X_A$=diamagnetic susceptibility of an atom or ion
$r$=radius of the electron orbit In order to calculate the total magnetic susceptibility of a compound received from the magnetic field, the diamagnetism of the constituent atoms are added plus a small constitutional correction, as the following equation shows:

$$X_m = N\mu^2/3_K T$$

$X_m$=molar susceptibility
$\mu$=magnetic moment
$N$=Avagadro's number

Paramagnetic compounds will produce two effects; the atomic moment (due to orbital electron) will line up according to the orientation of the magnetic field, at the same time the thermal agitation of the atoms will resist such line-up force. From the foregoing, it is clear that both the semiconductor material (oscillistor) and the surrounding compound are activated by the magnetic and electrical fields. As a result, their interaction with each other leads to the disturbance of the plasma, which in turn produces different frequencies. Since oscillation will only occur at a certain range of the magnetic field due to the threshold value, it is necessary that the range of such threshold value be obtained and calibrated before undertaking any determinations. Temperature affects oscillation greatly. In order to prevent thermal agitation of the oscillistor temperature control is essential. Since all tests have to be run under regular conditions, a stable room temperature is a necessary requirement for any chemical determination. To avoid radiation interference, the oscillistor can be encapsulated by a polyethylene container. Such container can be used for both liquid and gaseous chemicals. Since humidity effect can be a disturbing factor, to reduce this effect, a standard procedure of preheating the oscillistor should be undertaken. A 15 minute flush of the container by helium eliminates the air and moisture before any determination takes place.

An oscillistor with a high frequency is more sensitive to chemicals than one with a lower frequency. Some chemical compounds have been tested by two oscillistors; the one with higher frequency produces more change in frequency (quantity, waveform) than the other with a lower frequency. This indicates a trend, namely, sensitivity increases with the increase of basic frequency of oscillistor. Paramagnetic substances show more change in the frequency output of the oscillistor than diamagnetic substances (oxygen vs. helium). Comparing benzene with methanol, benzene is more stable (electron bond energy=999.6 kcal.) than methanol (452.1 kcal.). Consequently, the exchange of electron between oscillistor surface and benzene is much more in a regular pattern than with methanol. Due to this fact, the observed frequencies of both differ greatly. Benzene and its group affect frequency in a repeated way and methanol in a very complicated and irregular fashion. When members of the alcohol family were subjected to tests, a clear trend of change was observed. The irregular frequency (complicated harmonics) increases whereas the methyl group of alcohol decreases and vice versa in turn. The unstable part of the alcohol family is its hydroxy group, however, when more methyl groups are added to the chain, the stability of both electron and reactivity increases. It therefore leads to a repeated frequency output.

It is to be observed therefore that the present invention relates to a process of identifying an unknown chemical substance comprising the steps of subjecting an oscillistor to the influence of said substance in a controlled environment and, comparing the output from said oscillistor with the oscillistor output under the influence of known substances. Usually the output of said oscillistor is visibly displayed on display means such as an oscilliscope, and the oscillistor usually includes a germanium crystal slab. Preferably the controlled environment should be maintained at a convenient room temperature and the oscillistor should be placed in physical contact with the substance analyzed or identified.

It will be apparent to those skilled in the art, that my present invention is not limited to the specific details described above and shown in the drawings, and that various modifications are possible in carrying out the features of the invention and the operation and method of support, mounting and utilization thereof, without departing from the spirit and scope of the appended claims.

I claim:

1. The process of identifying an unknown chemical substance comprising the steps of:

subjecting an oscillistor to the influence of one or more known substances in a controlled environment to produce an output characteristic thereof, subjecting an oscillistor to the influence of an unknown substance in a controlled environment to produce an output characteristic thereof; and, matching the output characteristic of the oscillistor subject to the unknown substance to the output characteristic of the oscillistor subject to a known substance to identify the unknown substance.

2. The process of claim 1, wherein the output of said oscillistor is visibly displayed on display means.

3. The process of claim 1 wherein the oscillator includes a germanium crystal slab.

4. The process of claim 1 wherein said controlled environment is maintained at room temperature.

5. The process of claim 1 wherein the oscillistor is placed in physical contact with the substances identified.

References Cited by the Examiner

UNITED STATES PATENTS 2,965,842 12/60 Jacobson.

OTHER REFERENCES

Larrabee et al.: Journal of Applied Physics, vol. 31, No. 9, September 1960, pp. 1519–1923.

LOUIS R. PRINCE, *Primary Examiner.*

JOSEPH P. STRIZAK, RICHARD C. QUEISSER, *Examiners.*